United States Patent

[11] 3,625,975

| [72] | Inventors | Clifford A. Crampton<br>Harpenden;<br>Charles F. Cardy, Luton; Keith G.<br>Sampson, Clophill; Ian R. King, London,<br>all of England |
|---|---|---|
| [21] | Appl. No. | 671,201 |
| [22] | Filed | Sept. 28, 1967 |
| [45] | Patented | Dec. 7, 1971 |
| [73] | Assignee | Laporte Chemicals Limited |
| [32] | Priority | Sept. 30, 1966 |
| [33] | | Great Britain |
| [31] | | 43,880/66 |

[54] LACTONES BY OXIDATION PROCESS
22 Claims, No Drawings

[52] U.S. Cl. .................................................. 260/343,
260/343.5
[51] Int. Cl. .................................................. C07d 7/06,
C07d 7/00

[50] Field of Search ............................................ 260/343,
343.5, 343.6, 343.9

[56] References Cited
UNITED STATES PATENTS

| 3,064,008 | 11/1962 | Phillips et al. ................ | 260/343 |
| 3,274,216 | 9/1966 | Goldsmith et al. ............. | 260/343 |
| 3,428,656 | 2/1969 | Weiss ........................... | 260/343 |

*Primary Examiner*—John M. Ford
*Attorney*—Larson, Taylor & Hinds

ABSTRACT: Lactones are prepared by a reaction between a peroxycarboxylic acid having one to eight carbon atoms and a cyclic monoketone having five to 12 carbon atoms in a ring and zero to three methyl groups as substituents by means of a novel process involving forming a vapor mixture containing said peroxy carboxylic acid, condensing said vapor mixture to the liquid state and reacting the condensed liquid with said cyclic monoketone.

LACTONES BY OXIDATION PROCESS

This invention relates to the preparation of lactones and, in particular, to the formation of lactones by the reaction between a cyclic ketone and a peracid. It is especially concerned with the preparation of epsilon-caprolactone from cyclohexanone an performic or peracetic acid.

According to the invention there is provided a process for the preparation of a lactone wherein a vapor mixture containing peracid (as hereinafter defined) is initially prepared, is condensed to liquid, and is subsequently reacted with a cyclic ketone (as hereinafter defined).

Clearly the reaction with the cyclic ketone may be performed with peracid which has been previously prepared. Preferably, however, the peracid is freshly prepared and passed forward for reaction with the cyclic ketone. The term "peracid" is employed herein to refer to any peroxy carboxylic acid having up to eight carbon atoms in the molecule. Examples of particularly suitable acids are performic acid, peracetic acid, trifluoroperacetic acid, perproprionic acid, and perbutyric acid. In general it is preferred to use performic acid or peracetic acid. If peracid is employed in a mixture which also contains the corresponding carboxylic acid, the proportion of peracid in the mixture should not exceed 40 percent by weight, in the case of performic acid, and 50 percent by weight in the case of peracetic and other suitable peracids, although again 40 percent by weight is the preferred upper limit.

The term "cyclic ketone" is employed herein to refer to any cyclic monoketone having from five to 12 carbon atoms in the ring and having from zero to three methyl groups as substituents. Examples of such ketones are cyclohexanone; 2-methyl cyclohexanone; 3-methyl cyclohexanone; 4-methyl cyclohexanone; 3,3,5-trimethyl cyclohexanone and other methyl derivatives of cyclohexanone; cyclopentanone and its methyl derivatives; cyclooctanone and its methyl derivatives; cyclodecanone and its methyl derivatives; and cyclododecanone and its methyl derivatives.

The peracid can be prepared by oxidation of an aldehyde, but is preferably prepared by oxidation of a carboxylic acid using hydrogen peroxide. Thus, performic acid can be prepared by reacting hydrogen peroxide with formic acid at a preferred temperature of from 10° to 40° C. It may be produced either at atmospheric pressure under reduced pressure. A catalyst is not essential, but an acidic catalyst does make the reaction proceed more quickly. The molar ratio of formic acid to hydrogen peroxide is preferably within the range from 2:1 to 7:1.

In the preparation of peracetic acid from hydrogen peroxide and acetic acid, it is most desirable to use an acidic catalyst. Suitable acidic catalysts include cation exchange resins in the acid form, sulfuric acid, methane sulfonic acid, p-toluene sulfonic acid, pyrophosphoric acid and a mixture of o- and p-toluene sulfonic acids. The temperature is preferably within the range from 10° to 100° C., and more preferably 10° to 80° C. The preferred molar ratio of acetic acid to hydrogen peroxide is the same as that for formic acid i.e. within the range from 2:1 to 7:1. The amount of catalyst is preferably at least 0.25 percent of the total weight of reactants.

Peracids of higher molecular weight can be prepared by a method similar to that described above for peracetic acid, but in general the greater the molecular weight of the acid, the greater is the time required for the reaction to reach equilibrium conditions.

In the preparation of the peracid, both the carboxylic acid and the hydrogen peroxide can be in aqueous media, and it is a surprising feature of the process according to the invention that the presence of water in the peracid mixture does not prevent reaction with the cyclic ketone. The amount of water in the hydrogen peroxide should however preferably be not more than 20 percent by weight.

The vapor mixture containing peracid can be prepared by forming a liquid peracid mixture and then introducing the liquid into an evaporator. In the case of peracid prepared from hydrogen peroxide and acid, it can also be prepared either by introducing the reagents directly into the evaporator, and thus forming the peracid vapor in one step, or by starting the reaction in the manner required to form a liquid mixture but with the difference that before the reaction reaches completion the liquid mixture is introduced into the evaporator and the reaction is completed during the residence time in the evaporator. The vapor mixture from the evaporator is preferably passed into a fractionating column. When the peracid mixture is produced in a continuous manner in the presence of a catalyst, the catalyst is introduced into the evaporator before the reactants and remains in the evaporator throughout the reaction.

In general, peracid produced from hydrogen peroxide will be a mixture of peracid, acid, hydrogen peroxide, water and, in most instances where a catalyst has been used, residual catalyst.

The evaporation step has several useful effects on this mixture. Firstly, it produces a peracid vapor mixture free from any residual catalyst and any other nonvolatile impurities. This is important because it improves the stability of the peracid and also because residual catalyst would be likely to have an adverse effect during the reaction with the ketone. It would, for example, tend to polymerize the lactone. Secondly, the evaporation step produces a peracid vapor mixture having a greatly reduced amount of hydrogen peroxide and substantially the same amount of peracid, or even an increased amount of peracid, compared with the liquid equilibrium mixture that would be obtained from the reaction between the acid and hydrogen peroxide. This of course provides an improved ratio of peracid to hydrogen peroxide in the reaction medium and thus improves the yield of lactone. The lower amount of hydrogen peroxide reduces the possibility of forming cyclic ketone peroxides in the reaction with cyclic ketone. This is important because of the explosive nature of these compounds.

When a fractionating column is employed, the peracid mixture obtained is substantially free from hydrogen peroxide and contains more peracid than the liquid equilibrium mixture.

The evaporation is conveniently conducted by setting the temperature desired, which will usually be within the range from 20° to 90° C., and then reducing the pressure to the point at which the mixture boils. Alternatively, the pressure can first be set and the mixture then heated until boiling occurs. In the case of peracetic acid, the pressure should preferably be set within the range from 5 to 300 mm. Hg, most preferably from 30 to 80 mm. Hg. With performic acid, the preferred range is from 10 to 60 mm. Hg.

The reaction with cyclic ketone is carried out with the ketone in the liquid state, the peracid mixture having been condensed to liquid before being contacted with the ketone. Condensing the peracid has the advantages that the reaction with ketone can more easily be conducted at atmospheric pressure and that metering the desired quantity of peracid into the ketone reaction zone is more convenient.

The peracid mixture is preferably reacted with the cyclic ketone in a temperature-controlled reaction zone, that is to say a zone in which the temperature is kept at a fairly constant level by suitable cooling or heating. If desired the reaction can be allowed to proceed to completion in the temperature-controlled zone, but it may be advantageous to provide a second temperature-controlled zone after the first, where the reaction can be completed. It is sometimes advantageous to reflux the cyclic ketone continuously into at least part of the reaction zone and, if refluxing is carried out, it is preferred to reflux into the second temperature-controlled zone.

The preferred temperature for the reaction between the peracid and cyclic ketone is from 10° to 120° C. For the reaction with performic acid, the temperature is preferably within the range from 10° to 80° C., and with peracetic acid, the temperature is preferably within the range from 10° to 90° C.

In a typical batchwise process, the peracid is formed by placing in a vessel a mixture of carboxylic acid, hydrogen peroxide and a catalyst (if used) and stirring the mixture. The mixture is then distilled and the peracid vapor mixture so produced is condensed and passed into a vessel containing liquid cyclic ketone, and the reactants are stirred. The residence time for the batchwise reaction with performic acid is usually within the range from 5 to 30 minutes, and with peracetic acid is preferably from 30 minutes to 6 hours. The lactone is then removed from the product mixture by distillation.

The process proceeds well when operated in a batchwise manner but it is also particularly suited to continuous operation.

One suitable apparatus for continuous operation comprises the following units arranged in the order given: a rotary evaporator containing cation exchange resin; a fractionating column; a condenser; and a vertical packed column, fitted at the base with a boiler. Hydrogen peroxide and acid are continuously introduced into the rotary evaporator; a vapor mixture containing peracid is formed, passed through the fractionating column and the condenser and the condensed peracid is introduced into the packed column near the base. The cyclic ketone is continuously introduced into the packed column near the top and, as it runs down the column, is contacted by the peracid mixture. Unreacted cyclic ketone and the lactone produced run into the boiler and the cyclic ketone is refluxed so as to contact fresh peracid.

Some of the acid produced by the reaction, together with some of the water remaining from the peracid production step, and some of the excess cyclic ketone or peracid, passes out of the top of the column. Lactone, or a solution of it in cyclic ketone collects in the boiler and is run off continuously. The lactone is, where necessary, separated from the cyclic ketone by distillation, and the cyclic ketone is recycled. The vapor passing out of the top of the column is condensed and fractionated, and any unreacted acid and cyclic ketone are also recycled.

In a modification of this continuous method, a temperature-controlled vertical column is inserted between the condenser and the packed column, and the cyclic ketone is introduced continuously into this temperature-controlled column, where it mixes with the peracid before passing to the packed column. The reaction in the packed column is thereafter substantially as described above. Acid vapor, possibly with the water vapor and excess reactants, passes out of the top of the column and is fractionated and recycled, and lactone or a solution of it in excess or unreacted cyclic ketone collects in the boiler, and the lactone is separated by fractionation.

Instead of the vertical packed column fitted with a boiler from which the reaction product is removed for distillation of the lactone, a particularly convenient arrangement is provided by employing a reaction vessel, for example a coiled column, arranged in series with a continuous evaporator, for example a falling film evaporator fitted with a fractionating column. In this arrangement, the lactone is continuously removed from the product mixture. If desired, a mixing vessel for the cyclic ketone and peracid can be provided before the vessel in which the reaction between them is carried out.

When the cyclic ketone is cyclohexanone the lactone obtained is epsilon-caprolactone.

Particularly in the preparation of epsilon-caprolactone, it has been found that there is a tendency for the lactone product to contain some of the corresponding hydroxy acid and acyloxy acid. It has also been found, however, that on distilling the product some of these acids are converted into lactone. The conversion to lactone is preferably conducted in the presence of a metal salt of an organic acid having from one to six carbon atoms or a metal oxide, the metal being iron, zinc, copper, magnesium, calcium, strontium or barium (for example zinc oxide or barium acetate). If desired, the metal oxide or salt can be present in the zone in which the reaction between the cyclic ketone and peracid occurs. The metal oxide or salt not only assists in the conversion to lactone but also helps in preventing lactone from breaking down to give the corresponding hydroxy acid or acyloxy acid. This procedure is described and claimed in our copending application Ser. No. 671,199, filed Sept. 28, 1967.

The following examples illustrate processes conducted according to the invention.

EXAMPLE 1

Formic acid and hydrogen peroxide were introduced into a rotary evaporator containing 2 g. of Zeocarb 225 ion-exchange resin, at the rates of 1.80 moles/hour and 0.605 moles/hour respectively. The rotary evaporator was heated by air at 35° C. and had an internal pressure of 18 mm. Hg. The distillate from the evaporator was condensed continuously by a double-surface water-cooled condenser. The condensate was passed into a cooled packed column into which liquid cyclohexanone was continuously introduced at a rate of 0.98 moles/hour. The product from this reaction was passed into a packed column fitted with a boiler.

The boiler was initially charged with 0.5 moles of cyclohexanone. Cyclohexanone was continuously refluxed from the boiler into the second packed column and a mixture of caprolactone and cyclohexanone was continuously removed from it and distilled.

The run was continued for 7 hours by which time 2.72 moles of epsilon-caprolactone had been obtained. The yield was as follows:
69.5 percent based on hydrogen peroxide consumed.
83.0 percent based on cyclohexanone consumed.

EXAMPLE 2

A peracetic acid solution containing 31.2 percent peracetic acid, was passed steadily into a rotary evaporator over a period of 5 hours. A vapor mixture containing peracetic acid was continuously produced and condensed into a reservoir. The condensate was passed continuously into the base of a column packed with glass helices. The column was initially filled with cyclohexanone and fresh cyclohexanone was continuously introduced at the top. The temperature in the column was maintained at 50° C.

Epsilon-caprolactone together with unreacted cyclohexanone and acetic acid was continuously removed from the base of the column. After 5 hours the yield of caprolactone was:
92.0 percent based on hydrogen peroxide consumed.
84.0 percent based on cyclohexanone consumed.

EXAMPLE 3

A mixture comprising 4,300 ml. of acetic acid, 600 ml. of 98 percent by weight hydrogen peroxide, 150 ml. of water and 23 g. of Dowex 50W–X8 ion exchange resin was stirred for 5 days at room temperature. At the end of this period the product had the following composition:
0.77 M hydrogen peroxide,
4.10 M peracetic acid,
10.56 M acetic acid.
The peracetic acid solution was decanted from the ion exchange resin and fed continuously to a rotary evaporator heated by a water bath and maintained at 70° C. and 60 mm. Hg.

The peracetic acid solution was distilled for 1½ hours and the peracetic acid vapor mixture was condensed and collected. The distillate was analyzed and found to have the following composition:
0.24 M hydrogen peroxide,
4.5 M peracetic acid,
10.10 M acetic acid.
The distillate was then fed continuously into a mixing vessel into which cyclohexanone was also fed. The resulting mixture was continuously fed to a temperature-controlled coiled reactor in which the temperature was maintained at 60° C. The feed rate of peracetic acid solution was 412 ml. per hour and that of cyclohexanone was 388 ml. per hour.

After passage through the reactor, the reaction product was fed to a falling film evaporator maintained at 100° C. and 40 mm. Hg pressure. The acetic acid in the product was obtained as an overhead fraction and cyclohexanone and epsilon-caprolactone were obtained as a distillation residue. The distillation residue was then further fractionated to yield cyclohexanone and epsilon-caprolactone.

The yield of epsilon-caprolactone was:

88 percent (by weight) based on cyclohexanone consumed.
75 percent (by weight) based on peracetic acid consumed.

EXAMPLE 4

Acetic acid and hydrogen peroxide (85 percent by weight) were introduced into an evaporator, containing 14 g. of sulfuric acid, at the rates of 853 ml./hr. and 147 ml./hr. respectively. The distillate was passed through a fractionating column to a condenser and the liquid so obtained had the following composition:

34.5 percent by weight peracetic acid,
11.0 percent by weight water,
54.5 percent by weight acetic acid.

This liquid was then fed at a rate of 495 ml./hr. into a mixer into which cyclohexanone was introduced at a rate of 505 ml./hr. and the mixture thus obtained was passed into a reactor maintained at 60° C. by means of a warm water jacket.

The reaction mixture was passed from the reactor into a continuous stripping unit in which the acetic acid, excess cyclohexanone and water were collected as the top fraction. The bottom fraction was mainly epsilon-caprolactone but also contained acetoxycaproic acid and hydroxycaproic acid and was therefore further fractionated using a wiped film evaporator as a reboiler. The top fraction from the evaporator was pure epsilon-caprolactone, the yield being 89 percent (by weight) based on cyclohexanone consumed.

The bottom fraction included a polymeric product and was depolymerized by heating in the presence of zinc oxide.

EXAMPLE 5

Acetic acid and hydrogen peroxide (79 percent by weight) were introduced into an evaporator, as in example 4, at the rates of 830 ml./hr. and 170 ml./hr. respectively. The distillate had the following composition:

34.3 percent by weight peracetic acid,
13.4 percent by weight water,
51.9 percent by weight acetic acid.
0.4 percent by weight hydrogen peroxide The distillate was fed at the rate of 407 ml./hr., together with a mixture of monomethylcyclohexanones at a rate of 493 ml./hr., into a cooled mixing vessel and thence to a coiled reactor having a residence volume of 150 cm.$^3$ and maintained at 70° C. The reaction product was stripped of acetic acid, excess methylcyclohexanones and water in a continuous stripping unit with a falling film evaporator as reboiler. The resultant crude mixture of methylcaprolactones was distilled batchwise, with the addition of 2 percent by weight of zinc oxide to give a mixture of pure methylcaprolactones in 93 percent yield, based on cyclic ketone consumed.

We claim:

1. In a process for the preparation of a lactone by the reaction of a peroxycarboxylic acid with a cyclic monoketone, the improvement which comprises:
   a. reacting together a carboxylic acid having from one to eight carbon atoms with hydrogen peroxide in aqueous solution to give an aqueous percarboxylic acid reaction product solution;
   b. Distilling said aqueous percarboxylic acid reaction product solution to form a liquid percarboxylic acid distillate containing water and having a greatly reduced amount of hydrogen peroxide compared with the liquid equilibrium mixture that would be obtained from the reaction between the acid and hydrogen peroxide; and
   c. reacting said percarboxylic acid distillate immediately upon preparation with a cyclic monoketone having from five to 12 carbon atoms in the ring and from zero to three methyl groups as substituents to react therewith to form a lactone.

2. A process according to claim 1 wherein said hydrogen peroxide contains not more than about 20 percent by weight of water.

3. A process according to claim 1 wherein said peroxycarboxylic acid is selected from trifluoroperacetic acid, perpropionic acid and perbutyric acid.

4. A process according to claim 1 wherein said peroxycarboxylic acid is performic acid.

5. A process according to claim 1 wherein said peroxycarboxylic acid is peracetic acid.

6. A process according to claim 4 wherein formic acid is reacted with hydrogen peroxide at a temperature within the range from about 10° to about 40° C.

7. A process according to claim 5 wherein acetic acid is reacted with hydrogen peroxide at a temperature within the range from about 10° to about 100° C.

8. A process according to claim 7 wherein the temperature is within the range from about 10° to about 80° C.

9. A process according to claim 1 wherein an acidic catalyst is used in an amount of at least about 0.25 percent by weight of the reactants.

10. A process according to claim 9 wherein said peroxycarboxylic acid is produced by reaction between a carboxylic acid and hydrogen peroxide and the molar ratio of carboxylic acid to hydrogen peroxide is within the range from about 2:1 to about 7:1.

11. A process according to claim 1 wherein the distilled solution is passed through a fractionating column before being condensed.

12. A process according to claim 1 wherein the distillate containing said peroxycarboxylic acid is reacted with the cyclic monoketone in a first temperature-controlled zone.

13. A process according to claim 12, wherein the reaction is completed in a second temperature-controlled zone.

14. A process according to claim 12 wherein said cyclic ketone is continuously refluxed into at least part of the zone in which reaction between said peroxycarboxylic acid and said cyclic monoketone occurs.

15. A process according to claim 14 wherein said cyclic monoketone is continuously refluxed into the second temperature-controlled zone.

16. A process according to claim 1 wherein said peroxycarboxylic acid is reacted with said cyclic monoketone at a temperature within the range from about 10° to about 120° C.

17. A process according to claim 1 wherein performic acid is reacted with said cyclic monoketone at a temperature within the range from about 10° to about 80° C.

18. A process according to claim 1 wherein peracetic acid is reacted with said cyclic monoketone at a temperature within the range from about 10° to about 90° C.

19. A process according to claim 1 wherein said cyclic monoketone is cyclohexanone.

20. A process according to claim 1 wherein said cyclic monoketone is selected from the group consisting of 2-methyl cyclohexanone; 3-methyl cyclohexanone; 4-methyl cyclohexanone and 3,3,5-trimethyl cyclohexanone.

21. A process according to claim 1 wherein said cyclic monoketone is selected from the group consisting of cyclopentanone and methyl derivatives thereof; cyclooctanone and methyl derivatives thereof; cyclodecanone and methyl derivatives thereof and cyclododecanone and methyl derivatives thereof, the methyl derivative in each case containing from zero to three methyl groups.

22. A process according to claim 1 wherein said cyclic monoketone and said peroxycarboxylic acid are reacted in the presence of a metal compound selected from metal salts of organic acid having from one to six carbon atoms and metal oxides, said metal being selected from the group consisting of iron, zinc, copper, magnesium, calcium, strontium and barium.

* * * * *